United States Patent
Bray, Jr.

(10) Patent No.: US 10,772,377 B2
(45) Date of Patent: Sep. 15, 2020

(54) FOOTWEAR SOLE

(71) Applicant: TOTES ISOTONER CORPORATION, Cincinnati, OH (US)

(72) Inventor: Walter T. Bray, Jr., Cincinnati, OH (US)

(73) Assignee: TOTES ISOTONER CORPORATION, Cincinnati, OH (US)

( * ) Notice: Subject to any disclaimer, the term of this patent is extended or adjusted under 35 U.S.C. 154(b) by 0 days.

(21) Appl. No.: 15/343,881

(22) Filed: Nov. 4, 2016

(65) Prior Publication Data

US 2018/0125156 A1 May 10, 2018

(51) Int. Cl.
| | |
|---|---|
| A43B 13/04 | (2006.01) |
| A43B 23/02 | (2006.01) |
| A43B 13/18 | (2006.01) |
| A43B 1/10 | (2006.01) |
| A43B 1/14 | (2006.01) |
| A43B 3/02 | (2006.01) |
| A43B 3/10 | (2006.01) |
| A43B 3/12 | (2006.01) |
| A43B 5/12 | (2006.01) |
| A43B 13/12 | (2006.01) |
| A43B 13/14 | (2006.01) |
| B29D 35/12 | (2010.01) |
| B29K 21/00 | (2006.01) |
| B29K 23/00 | (2006.01) |
| B29K 105/00 | (2006.01) |

(52) U.S. Cl.
CPC .............. *A43B 13/04* (2013.01); *A43B 1/10* (2013.01); *A43B 1/14* (2013.01); *A43B 3/02* (2013.01); *A43B 3/101* (2013.01); *A43B 3/128* (2013.01); *A43B 5/12* (2013.01); *A43B 13/12* (2013.01); *A43B 13/141* (2013.01); *A43B 13/181* (2013.01); *A43B 13/187* (2013.01); *A43B 23/0205* (2013.01); *A43B 23/028* (2013.01); *B29D 35/122* (2013.01); *B29K 2021/00* (2013.01); *B29K 2023/083* (2013.01); *B29K 2105/0032* (2013.01)

(58) Field of Classification Search
None
See application file for complete search history.

(56) References Cited

U.S. PATENT DOCUMENTS

| | | | |
|---|---|---|---|
| 6,797,737 B1 | 9/2004 | Hsu et al. | |
| 9,867,424 B2 | 1/2018 | Wawrousek et al. | |
| 2004/0000255 A1* | 1/2004 | Hernandez | A43B 13/04 |
| | | | 106/38 |
| 2005/0005474 A1 | 1/2005 | Lai et al. | |
| 2005/0008735 A1* | 1/2005 | Pearce | A23G 3/36 |
| | | | 426/89 |
| 2010/0105798 A1* | 4/2010 | Hasegawa | C08F 299/00 |
| | | | 522/99 |
| 2012/0308752 A1* | 12/2012 | He | C08L 23/08 |
| | | | 428/36.91 |
| 2015/0086519 A1* | 3/2015 | Chow | B29C 47/0004 |
| | | | 424/93.46 |
| 2018/0079887 A1* | 3/2018 | Chino | C08F 210/02 |
| 2018/0125157 A1 | 5/2018 | Bray, Jr. | |
| 2019/0281921 A1 | 9/2019 | Bray, Jr. | |

FOREIGN PATENT DOCUMENTS

| | | | |
|---|---|---|---|
| CN | 103709581 A | * | 4/2014 |
| EP | 2856896 A1 | | 4/2015 |
| JP | H0374439 A | | 3/1991 |
| JP | 2004136018 A | | 5/2004 |
| WO | 03105618 A2 | | 12/2003 |
| WO | 2013138439 A1 | | 9/2013 |
| WO | WO2013134354 A2 | * | 9/2013 |
| WO | 2018083676 A1 | | 5/2018 |

OTHER PUBLICATIONS http://precipitatedcalciumcarbonate.com"CalciumCarbonateBulkingagent" (2019).*
CN 103709581 A machine translation (2014).*
Christian et al. "Preparation and Characterization of Ethylene Vinyl Acetate/Polybutadiene Rubber/Natural Rubber (EVA/BR/NR) Based Thermoplastic Elastomer for Footwear Application." International Journal of Advance Research and Innovative Ideas in Education. 2017: 5456-5460. vol. 3, Issue 2.

(Continued)

*Primary Examiner* — Ana L. Woodward
(74) *Attorney, Agent, or Firm* — Rossi, Kimms & McDowell LLP

(57) ABSTRACT

In aspects of the invention, a footwear sole can include a sole member formed of a single unitary layer, wherein the sole member is formed of a compound including ethyl vinyl acetate (EVA) and rubber. The compound can further include a bulking agent. The compound can further include a foaming agent, a color master agent and a bridging agent. The sole member can include a top surface, the top surface including a plurality of apertures defined in a rear portion of the top surface. The plurality of apertures can define a tapered shape, and a first aperture of the plurality of apertures can have a depth that is less than a second aperture of the plurality of apertures. The plurality of apertures can be arranged in a plurality of rows.

4 Claims, 4 Drawing Sheets

(56) References Cited

OTHER PUBLICATIONS

Srilathakutty. "Studies on New Base Materials for Microcellular Soles." Aug. 1998: 1-369. Department of Polymer Science and Rubber Technology, Cochin University of Science and Technology.
International Search Report issued in International Application No. PCT/IB2017/056930 dated Feb. 12, 2018.
Written Opinion issued in International Application No. PCT/IB2017/056930 dated Feb. 12, 2018.
Extended European Search Report issued in European Appln. No. 17195561.0 dated Feb. 12, 2018.
International Preliminary Report on Patentability issued in Intl. Appln. No. PCT/IB2017/056930 dated May 16, 2019.
Office Action issued in U.S. Appl. No. 15/803,998 dated Apr. 2, 2019.
Restriction Requirement issued in U.S. Appl. No. 15/803,998 dated Oct. 29, 2018.
Office Action issued in U.S. Appl. No. 16/367,316 dated Sep. 23, 2019.
Office Action issued in U.S. Appl. No. 15/803,998 dated Nov. 20, 2019.

\* cited by examiner

FOOTWEAR SOLE

BACKGROUND

This disclosure is generally related to footwear soles, and more particularly to footwear sole that can be used as a component in various types of footwear, such as, for example shoes, boots and/or slippers.

DESCRIPTION OF THE RELATED ART

Typically, in many types of footwear, the footwear is formed of an outsole (or sole) that is attached to an upper. The outsole is used to provide comfort and support for the foot of the wearer, as well as durability of the footwear. To achieve these objectives, the outsole is typically formed of separate components arranged in multiple layers, with each layer addressing a particular need. For example, one component provides cushioning and comfort to the wearer, while another component provides stability and durability. Often, the separate components are secured together by cementing or stitching.

The need to separately form and combine these multiple layers to provide comfort and durability leads to additional costs. Thus, there is a need in the art for an improved footwear outsole

BRIEF SUMMARY

Aspects of the present invention address the above-discussed shortcomings in the related art, and other needs. The subject of the present application is an outsole, or sole, for use in footwear. In some aspects of the invention, the sole comprises a single, unitary layer. The sole can be formed from a unique compound having unique and beneficial qualities. The compound can include both rubber and ethyl vinyl acetate (EVA). The compound can also include blowing agents and minimal amounts of other compound binding agents. The compound includes these various components in specific amounts.

In some aspects of the invention, the sole can be combined with additional layers and/or components. In some aspects of the invention, the sole can be combined with various types of uppers and used as part of various types of footwear, such as shoes, boots and/or slippers. In some embodiments, footwear, such as boots, can be molded from this sole material.

Some aspects of the invention include a footwear sole comprising: a sole member formed of a single unitary layer; wherein the sole member is formed of a compound including ethyl vinyl acetate (EVA), and rubber.

Some aspects of the invention include a footwear sole, comprising: a sole member formed of a single unitary layer; wherein the sole member is formed of a compound including ethyl vinyl acetate (EVA) in the range of 20% to 60%; rubber in the range of 25% to 70%; bulking agent in the range of 6% to 12%; foaming agent in the range of 0.5% to 12%; color master agent in the range of 0% to 2%; and bridging agent in the range of 1% to 5%.

Some aspects of the invention include a footwear item, comprising an upper; and a sole member attached to the upper, the sole member being formed of a single unitary layer; wherein the sole member is formed of a compound including ethyl vinyl acetate (EVA), rubber.

Some aspects of the invention include a boot, comprising: a sole member; and a boot shaft, wherein the sole member and boot shaft are formed of a single compound, and wherein the single compound includes ethyl vinyl acetate (EVA), and rubber.

Some aspects of the invention include a boot, comprising: a sole member; and a boot shaft connected to the sole member, wherein the sole member is formed of a single compound, wherein the single compound includes ethyl vinyl acetate (EVA), and rubber, and wherein the boot shaft is formed of a material different than the compound.

Some aspects of the invention include a shoe, comprising: a sole member; and an upper connected to the sole member, wherein the sole member is formed of a single compound, wherein the single compound includes ethyl vinyl acetate (EVA), and rubber, and wherein the upper is formed of a material different than the compound.

Some aspects of the invention include a method of forming a footwear sole, the method comprising: forming a sole compound; shaping the sole compound in a mold; and removing the shaped sole from the mold, wherein the sole compound includes ethyl vinyl acetate (EVA) and rubber.

Some aspects of the invention include a method of forming a footwear sole, the method comprising: forming a sole compound; shaping the sole compound in a mold; and removing the shaped sole from the mold, wherein the sole compound includes ethyl vinyl acetate (EVA), and rubber.

By way of aspects of the present invention, a footwear sole is provided that addresses multiple needs, and can reduce costs and complexities in the manufacturing process, while providing comfort, lightness and durability. Other benefits of the present invention are described below.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures have not been shown or described in detail to avoid unnecessarily obscuring descriptions of the embodiments of the invention.

Figure 1:
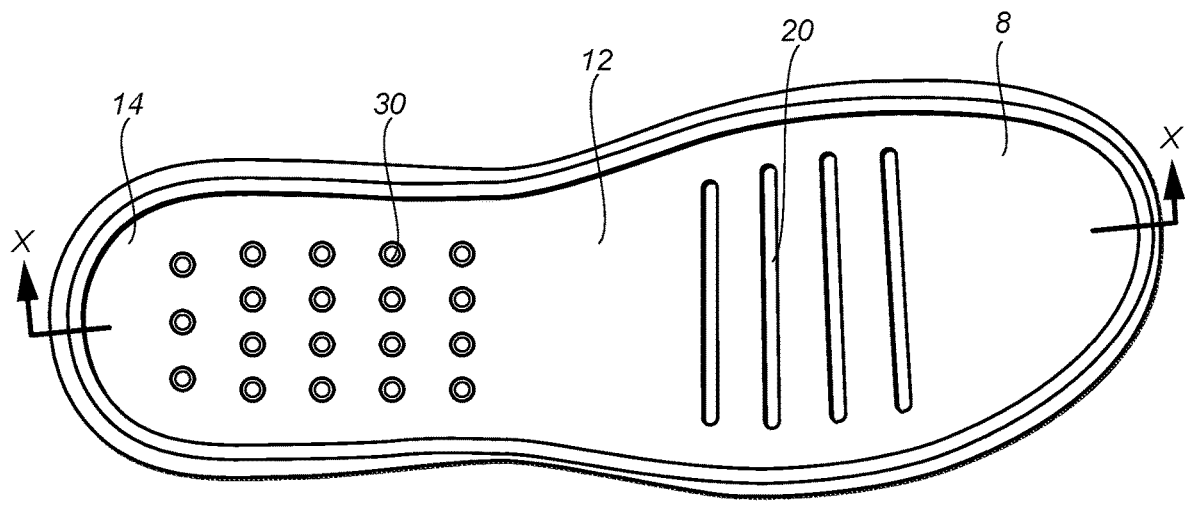
FIG. 1 is a top view of a footwear sole, in accordance with embodiments of the invention.

FIG. 1 shows a top view of a footwear sole (or sole member) 100, in accordance with embodiments of the invention. As used herein, the term "footwear" means a device or item worn on a user's foot, for example, a shoe. Non-limiting examples of footwear may include a slipper, a sock, a ballet slipper, a sport shoe, a sandal, a boot, a dress shoe, and the like. Other examples of footwear, as are known to those of skill in the art, can also be included.

As used herein, the term "sole" can be a unitary sole, an insole, outsole, or any combination thereof, with or without additional components added.

Sole 100 is formed of a sole compound that is described in further detail below. In some embodiments, Sole 100 includes a top surface 8 including a front portion 10, a middle portion 12, and a rear portion 14. The front portion 10 is proximate the area where a wearer's toes would be located, the rear portion 14 is proximate the area where a wearer's heel would be located, and the middle portion 12 is located between the front portion 10 and rear portion 14. In some embodiments, grooves 20 are disposed in top surface 8 of the front portion 10 of sole 100. In some embodiments, grooves 20 can be arranged in a substantially parallel arrangement, extending away from one side of the sole 100, towards the other side. In some embodiments, sole 100 can include four grooves 20. In other embodiments, other arrangements of grooves 20 can be used. In some embodiments, sole 100 does not include any grooves 20.

Apertures 30 are also defined in top surface 8 of sole 100. Apertures 30 can allow for sole 100 to be lighter, while also providing some cushioning benefits. Apertures 30 can be arranged in rows. In one embodiment, sole 100 includes rows of apertures 30. Each row can include three or four apertures 30. In other embodiments, different configurations of apertures 30 can be used. In some embodiments, no apertures 30 are defined in sole 100.

Figure 2:
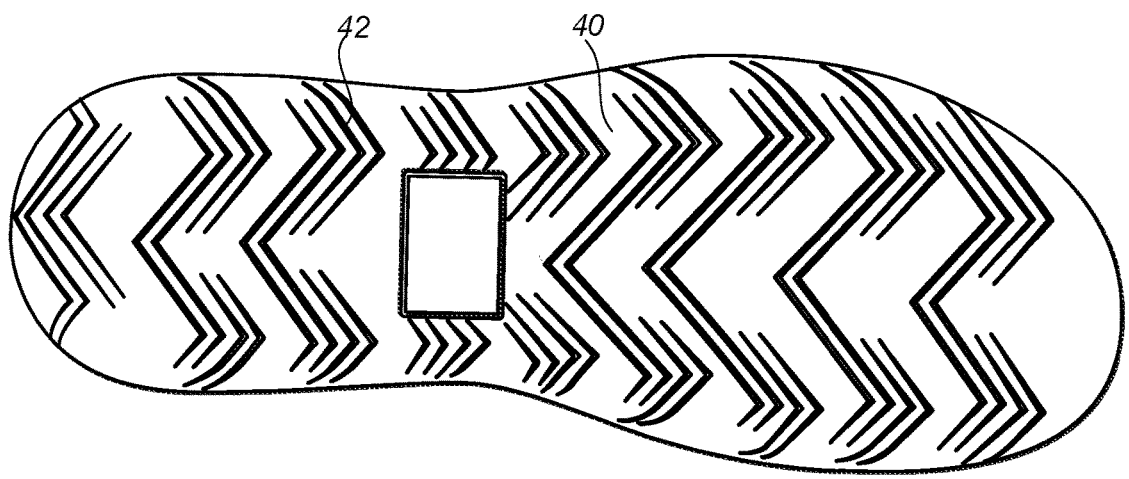
FIG. 2 is a bottom view of the footwear sole of FIG. 1.

FIG. 2 shows a bottom view of a footwear sole 100. In some embodiments, recessed grooves 42 are defined in a bottom surface 40 of sole 100. Recessed grooves 42 can provide traction while walking on smooth or wet surfaces. Recessed grooves 42 can be formed in a chevron or zig-zag pattern. Alternatively, other patterns can also be used. The grooves 42 can end with the recess raising to the bottom surface 40. Sole 100 can include a sidewall that extends beyond a walking surface of bottom surface 40. In other embodiments, different configurations of grooves 42 can be used. In still other embodiments, no grooves 42 are defined in bottom surface 40 sole 100.

Figure 3:
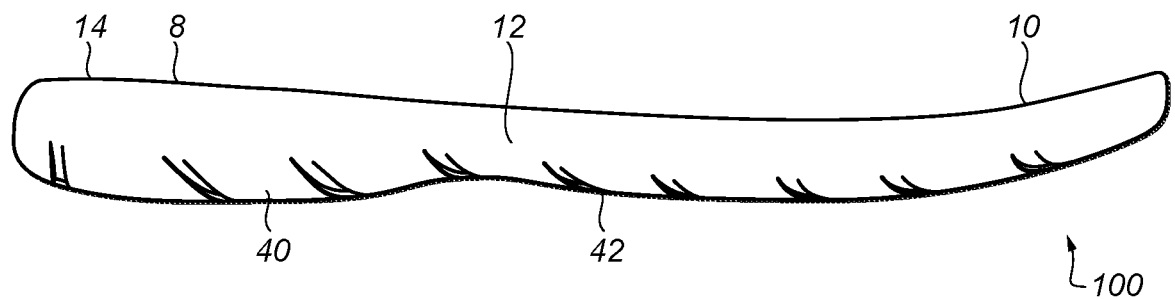
FIG. 3 is a side view of the footwear sole of FIG. 1.

FIG. 3 shows a side view of a footwear sole 100. In some embodiments, grooves 42 can extend to an outer edge of sole 100. The grooves 42 can end with the recess, raising to the surface of the edge of sole 100.

Figure 4:
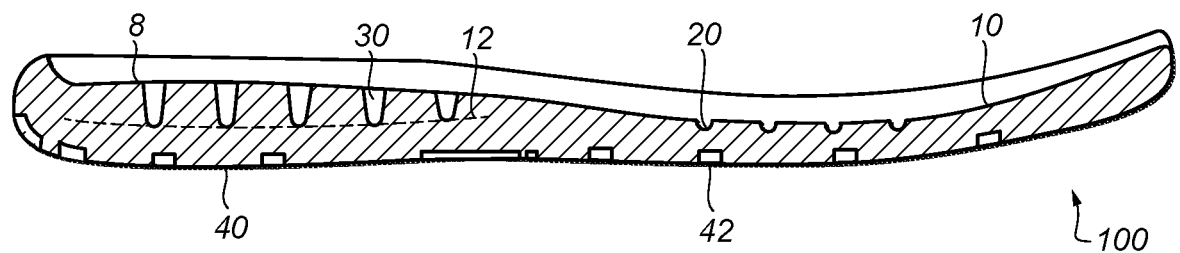
FIG. 4 is a longitudinal cross-sectional view, along the axis x-x, of the footwear sole of FIG. 1.

FIG. 4 shows a cross-sectional view of sole 100 taken along line X-X of FIG. 1. Apertures 30 can include a tapered shape, with different apertures 30 having different depths. In some embodiments, the apertures 30 can all have the same depth. In other embodiments, different arrangements of apertures 30, or no apertures 30, can be used.

While the sole 100 has been described herein as including certain features, such as, by way of non-limiting example, grooves 20, apertures 30 and/or recessed grooves 42, embodiments of the invention can be directed to a sole 100 that does not include one or more of these and other described features, or other combinations of these features.

Further, in some embodiments, sole 100 can include other features, not described herein.

Figure 5:
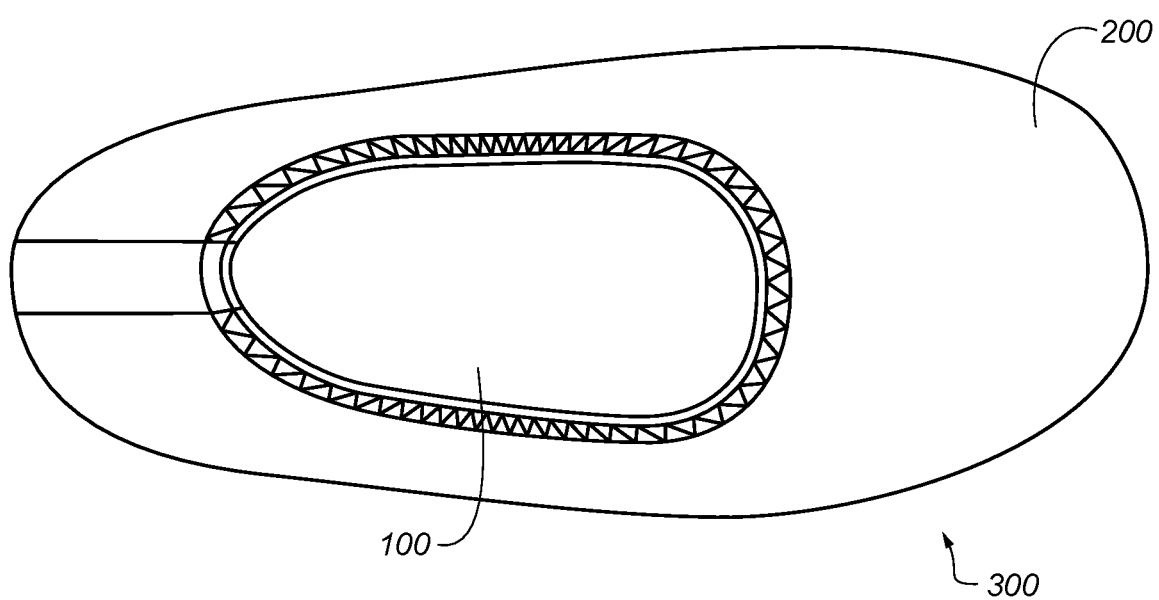
FIG. 5 is a footwear item, including an upper and a footwear sole, in accordance with embodiments of the invention.
Figure 6:
FIG. 6 is another footwear item, including an upper and a footwear sole, in accordance with embodiments of the invention.
Figure 7:
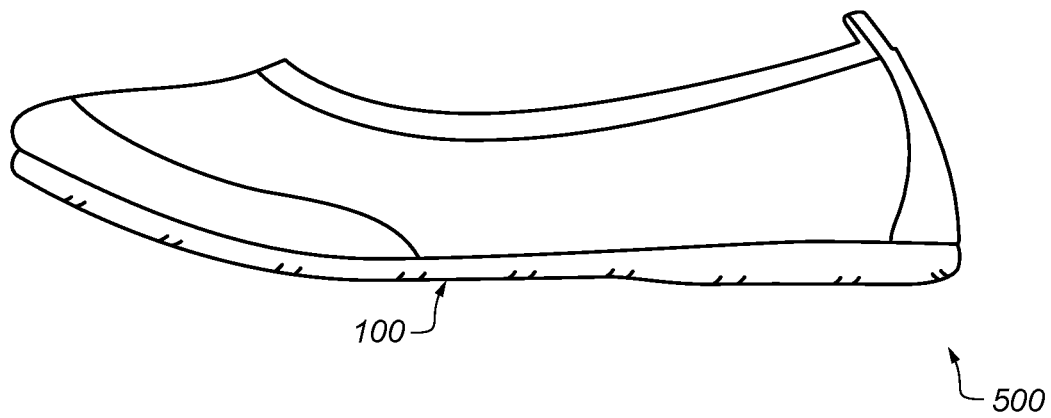
FIG. 7 is another footwear item, including an upper and a footwear sole, in accordance with embodiments of the invention.

FIG. 5 shows a view of a footwear item 300, including a sole 100 and an upper 200. With footwear item 300, sole 100 is attached to upper 200 in a manner known to those of skill in the art. By way of certain embodiments, footwear item 300 can take various forms, such as that of a slipper, a sandal, a boot, as well as other forms. FIG. 6 shows a view of a footwear item 400, including a sole 100. Footwear item 400 can be, for example, a boot. In some embodiments, a boot, such as a waterproof rain boot (or other type of boot) can be formed substantially entirely from the above-described sole compound. In other embodiments, a rain boot sole and upper could be formed with other portions of the boot, such as a boot shaft or zipper being added to the portions formed with the sole compound. The other portions may be made from materials other than the sole compound. FIG. 7 shows a view of a footwear item 500, including a sole 100. An upper can be attached to sole 100. Footwear item 500 can be, for example, a ballet slipper.

In some embodiments, the rubber compound is comprised of the following components, in the following percentages: ethyl vinyl acetate (EVA), in the range of 20% to 60%, preferably 42% to 46%, and more preferably 44%; rubber in the range of 25% to 70%, preferably 38% to 42%, and more preferably 40%; bulking agent in the range of 6% to 12%, preferably 6% to 8%, and more preferably 6%; foaming agent (also referred to herein as a "blowing agent") in the range of 0.5% to 12%, preferably 6% to 10%, and more preferably 8%; color master agent in the range of 0% to 2%, preferably 0.5% to 1.5%, and more preferably 1%; and bridging agent in the range of 1% to 5%, more preferably 1% to 3%, and more preferably 1%.

In some embodiments, the rubber compound is comprised of the following components, in the following percentages: ethyl vinyl acetate (EVA), in the range of 20% to 60%, preferably 57% to 60%, and more preferably 59%; rubber in the range of 25% to 70%, preferably 28% to 32%, and more preferably 30%; bulking agent in the range of 6%/0 to 12%, preferably 6% to 8%, and more preferably 6%; foaming agent in the range of 0.5% to 12%, preferably 1% to 5%, and more preferably 3%; color master agent in the range of 0% to 2%, preferably 0.5% to 2%, and more preferably 1%; and bridging agent in the range of 1% to 5%, more preferably 1% to 2.5%, and more preferably 1%.

In some embodiments, the rubber compound is comprised of the following components, in the following percentages: ethyl vinyl acetate (EVA), in the range of 20% to 60%, preferably 20% to 22%, and more preferably 20%; rubber in the range of 25% to 70%, preferably 66% to 70%, and more preferably 70%; bulking agent in the range of 6% to 12%, preferably 6% to 8%, and more preferably 6.2%; foaming agent in the range of 0.5% to 12%, preferably 0.5% to 3%, and more preferably 0.8%; color master agent in the range of 0% to 2%, preferably 0.5% to 2%, and more preferably 1.5%; and bridging agent in the range of 1% to 5%, more preferably 1% to 2.5%, and more preferably 1.5%.

In some embodiments, the rubber compound is formed by combining the above-described ingredients, and forming the sole 100 using a mold. More Specifically, the process of forming the rubber compound into the sole 100 can also include the steps of combining the above-described raw materials (melted down) in a hopper. Materials can be used in bead form. Next, the raw materials are then injected into a mold. Then, the raw materials are formed into the desired sole shape, based on the shape of the mold. The formed sole is then removed from the mold. Next, the sole is further shaped with a shoe last, thus completing the formation of the sole. In some embodiments, in addition, a cover mold is use for application of flock. A primer, and then glue are sprayed on the bottom of the sole using the cover mold. Flock is then dusted onto the glue. Finally, the excess flock is removed from the glued surfaces.

In some embodiments, these steps are performed in a different order. In some embodiments, some steps are excluded, and/or some steps are performed multiple times.

Through experimentation, the inventor has found that a sole 100 formed from this unique and inventive rubber compound has properties not found in other footwear soles. Specifically, a sole 100 formed from this unique and inventive rubber compound, that includes a combination of ethyl vinyl acetate (EVA) and rubber can provide a softness and rebound (i.e., retention of original shape after repeated compression), not seen in other soles, which are comprised primarily of either EVA or rubber alone. In addition increased flexibility, compression resistance, and a light weight can also be achieved. In some embodiments, durability can also be improved.

In some embodiments, the sole 100 can have a density of about 28 pounds-per-cubic-foot and a hardness of about 21 newtons. In other embodiments, other values of density and/or hardness can be provided.

Further, by forming the sole 100 as a single layer, sole 100 can deliver cushioning and support similar to that delivered by the use of multiple layers/densities of various cushioning materials, as is typical in current footwear. The present inventive sole 100 also eliminates the need for a separate outsole as well. This feature contributes to reduced costs and complexities in the manufacturing process. In addition, a sole formed with the above-discussed compound is lightweight, which is beneficial to the wearer. The sole 100 can also be waterproof.

In some embodiments, a separate top member can be disposed on the top surface of the sole 100. In some embodiments, the top member is a cushion layer, including, for example, memory foam. In other embodiments, a separate cover layer can cover all or a portion of sole 100. In some embodiments, the cover layer can be formed of fabric.

In some embodiments, a footwear item, including sole and upper portions, can be formed from the sole compound in, for example, a single-shot molding process. For example, a waterproof rain boot (or other type of boot) could be formed substantially entirely from the sole compound. In other embodiments, a rain boot sole and upper could be formed with other portions of the boot, such as a boot shaft or zipper being added to the portions formed with the sole compound.

In some embodiments, the footwear item can be a slipper, ballet slipper, or other form of footwear.

In addition, due, in part, to the combination of ethyl vinyl acetate (EVA) and blowing agent in the above-discussed rubber compound provides for a light weight sole 100, while still allowing for forming the sole in a mold. The sole 100 is durable, in part, due to the characteristics of the rubber contribute to cushioning and durability. Thus, a sole 100 as described herein is light comfortable and durable.

In general, in the following claims, the terms used should not be construed to limit the invention to the specific embodiments disclosed in the specification and the claims, but should be construed to include all devices in accordance with the claims. Accordingly, the invention is not limited by the disclosure, but instead its scope is to be determined entirely by the following claims.

What is claimed is:

1. A footwear sole, comprising:
a unitary sole member formed of a single unitary layer;
the unitary sole member including a top surface configured to support the surface of a foot; and
the unitary sole member including a bottom surface configured to contact a ground surface
wherein the unitary sole member is formed of a compound including
ethyl vinyl acetate (EVA) 44%;
rubber 40%;
bulking agent 6%;
foaming agent in the range of 8%;
color master agent 1%; and
bridging agent 1%.

2. A footwear sole, comprising:
a unitary sole member formed of a single unitary layer;
the unitary sole member including a top surface configured to support the surface of a foot; and
the unitary sole member including a bottom surface configured to contact a ground surface,
wherein the unitary sole member is formed of a compound including foaming agent 8%;
ethyl vinyl acetate (EVA) in the range of 42% to 46%; and
rubber in the range of 38% to 42%.

3. A footwear sole, comprising:
a unitary sole member formed of a single unitary layer;
the unitary sole member including a top surface configured to support the surface of a foot; and
the unitary sole member including a bottom surface configured to contact a ground surface,
wherein the unitary sole member is formed of a compound including foaming agent 8%;
ethyl vinyl acetate (EVA) in the range of 57% to 60%; and
rubber in the range of 28% to 32%.

4. A footwear sole, comprising:
a unitary sole member formed of a single unitary layer;
the unitary sole member including a top surface configured to support the surface of a foot; and
the unitary sole member including a bottom surface configured to contact a ground surface,
wherein the unitary sole member is formed of a compound including foaming agent 8%;
ethyl vinyl acetate (EVA) in the range of 26% to 28%; and
rubber in the range of 60% to 65%.

* * * * *